(12) United States Patent
Wu et al.

(10) Patent No.: US 11,035,939 B2
(45) Date of Patent: Jun. 15, 2021

(54) ULTRASONIC SENSING DEVICE

(71) Applicant: ASUSTeK COMPUTER INC., Taipei (TW)

(72) Inventors: Hsin-Han Wu, Taipei (TW); Li-De Hsieh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 98 days.

(21) Appl. No.: 16/512,702

(22) Filed: Jul. 16, 2019

(65) Prior Publication Data

US 2020/0072954 A1 Mar. 5, 2020

(30) Foreign Application Priority Data

Aug. 29, 2018 (CN) .......................... 201810992673.8

(51) Int. Cl.
*G01S 1/00* (2006.01)
*G01S 7/521* (2006.01)
*G01S 15/04* (2006.01)
*G01S 15/08* (2006.01)

(52) U.S. Cl.
CPC .............. *G01S 7/521* (2013.01); *G01S 15/04* (2013.01); *G01S 15/08* (2013.01)

(58) Field of Classification Search
CPC .................................... G01S 1/00; G10K 1/00
See application file for complete search history.

(56) References Cited

U.S. PATENT DOCUMENTS

| 2008/0232197 A1* | 9/2008 | Kojima ................. G01S 15/931 367/99 |
| 2013/0098157 A1* | 4/2013 | Suzuki ................... G01N 29/24 73/597 |
| 2013/0300298 A1* | 11/2013 | Moeller ................. G01S 15/50 315/152 |

FOREIGN PATENT DOCUMENTS

| CN | 101782378 B | 12/2011 |
| CN | 204462384 U | 7/2015 |

* cited by examiner

*Primary Examiner* — Shirley Lu
(74) *Attorney, Agent, or Firm* — McClure, Qualey & Rodack, LLP (57) ABSTRACT

The disclosure discloses an ultrasonic sensing device, including a first shell portion, a second shell portion and an ultrasonic sensor. The first shell portion has a first through hole. The first through hole includes a first opening and a second opening. The second shell portion has a second through hole. The second through hole includes a third opening and a fourth opening. The ultrasonic sensor includes a transmitting unit and a receiving unit. The transmitting unit is coupled to the first opening. The receiving unit is coupled to the third opening. At least one of the second opening and the fourth opening is elongated. The ultrasonic sensing device greatly reduces the direct transmission of ultrasonic wave from the transmitting unit to the receiving unit.

10 Claims, 11 Drawing Sheets

ULTRASONIC SENSING DEVICE

CROSS-REFERENCE TO RELATED APPLICATION

This application claims the priority benefit of Chinese Application Serial No. 201810992673.8, filed on Aug. 29, 2018. The entirety of the above-mentioned patent application is hereby incorporated by reference herein and made a part of specification.

BACKGROUND OF THE INVENTION

Field of the Invention

The invention relates to an ultrasonic sensing device.

Description of the Related Art

An ultrasonic sensor includes a transmitting end and a receiving end. The transmitting end transmits ultrasonic wave outside, an external object reflects the ultrasonic wave, and then the receiving end receives the reflected ultrasonic wave and converts the ultrasonic wave into signals for subsequent operation.

However, the transmitted ultrasonic wave often undergoes crosstalk with the reflected ultrasonic wave, and if the distance between the transmitting end and the receiving end is small, the direct transmission of the ultrasonic wave from the transmitting end to the receiving end is more likely to occur.

In addition, when the known ultrasonic sensor is used in detecting a front obstacle, the ultrasonic wave transmitted by the transmitting end is prone to be reflected by a small object on the ground, so that the receiving end likely to detect the small object on the ground. Moreover, the wavelength of the ultrasonic wave reflected by the small object is prone to a difference from the wavelength of the ultrasonic wave transmitted by the transmitting end by half a wavelength, which counteract each other and produce a detection blind area, and the efficiency of ultrasonic detection is reduced.

BRIEF SUMMARY OF THE INVENTION

The disclosure is directed to provide an ultrasonic sensing device capable of greatly reducing the direct transmission of ultrasonic wave from a transmitting unit to a receiving unit.

The disclosure provides an ultrasonic sensing device, including a first shell portion, a second shell portion and an ultrasonic sensor. The first shell portion has a first through hole. The first through hole includes a first opening and a second opening. The second shell portion has a second through hole. The second through hole includes a third opening and a fourth opening. The ultrasonic sensor includes a transmitting unit and a receiving unit. The transmitting unit is coupled to the first opening. The receiving unit is coupled to the third opening. At least one of the second opening and the fourth opening is elongated.

In the ultrasonic sensing device of the disclosure, the first shell portion and the second shell portion having special structures are used to separate the transmitting unit and the receiving unit of the ultrasonic sensor, so as to greatly reduce the direct transmission of ultrasonic wave from the transmitting unit to the receiving unit. Furthermore, the second opening is elongated and is smaller than the first opening in opening area, so that the ultrasonic wave exiting from the second opening diffracts, and is concentrated within the transmission range of ultrasonic wave in the long axis direction of the second opening and expanded within the transmission range of ultrasonic wave in the short axis direction of the second opening, thereby reducing the detection of small objects on the ground when a front obstacle is detected and increasing the horizontal diffusion of the ultrasonic wave.

The above descriptions are only used to describe the problems to be resolved by the disclosure, the technical means for resolving the problems, and effects thereof. Specific details of the disclosure are described in detail in the following embodiments and accompanying drawings.

DETAILED DESCRIPTION OF THE EMBODIMENTS

A plurality of embodiments of the disclosure is disclosed below by using figures. For clear description, many practical details are described together in the following statement. However, it should be learnt that these practical details should not be intended to limit the disclosure. That is, in some embodiments of the disclosure, these practical details are unnecessary. In addition, to simplify the figures, some conventional common structures and elements are illustrated in a simple schematic manner in the figures.

Figure 1:
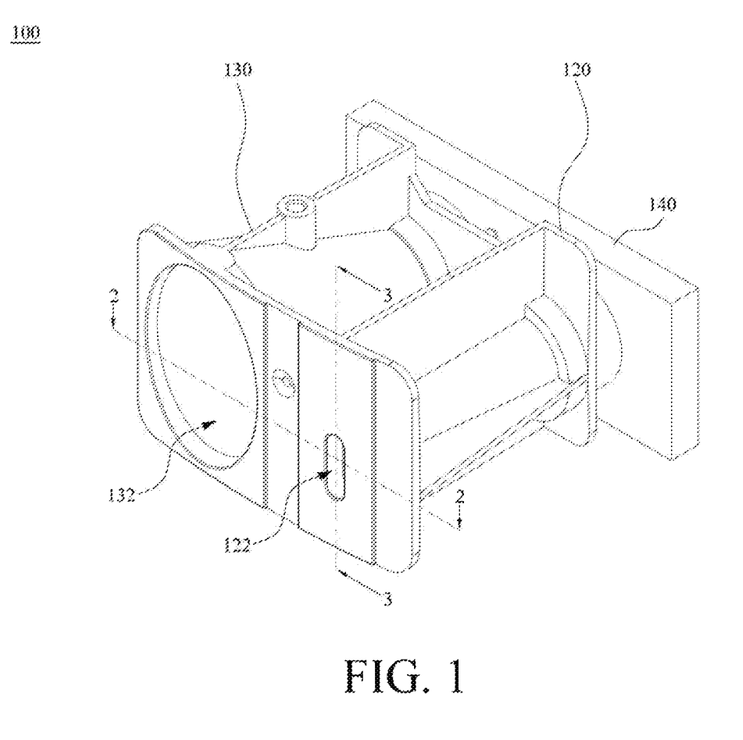
FIG. 1 is a three-dimensional diagram of an ultrasonic sensing device according to an embodiment of the disclosure.
Figure 2:
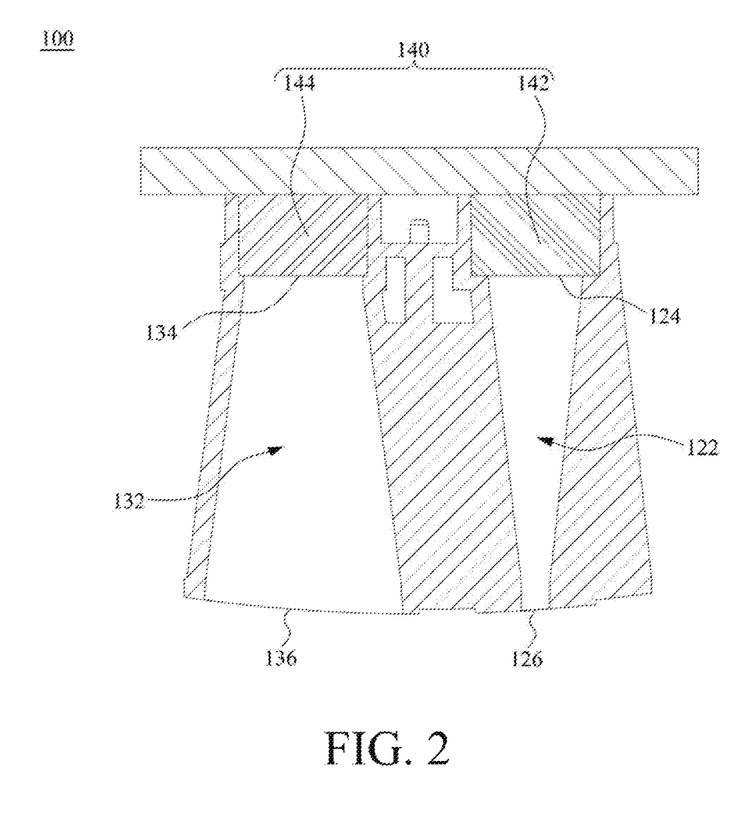
FIG. 2 is a cross-sectional view of the ultrasonic sensing device taken along line 2-2 in FIG. 1.

Refer to FIG. 1 and FIG. 2 together. FIG. 1 is a three-dimensional diagram of an ultrasonic sensing device 100 according to an embodiment of the disclosure. FIG. 2 is a cross-sectional view of the ultrasonic sensing device 100 taken along line 2-2 in FIG. 1. The ultrasonic sensing device 100 includes a first shell portion 120, a second shell portion 130, and an ultrasonic sensor 140. The first shell portion 120 has a first through hole 122. The first through hole 122 includes a first opening 124 and a second opening 126. The second shell portion 130 has a second through hole 132. The second through hole 132 includes a third opening 134 and a fourth opening 136. The ultrasonic sensor 140 includes a transmitting unit 142 and a receiving unit 144. The transmitting unit 142 is coupled to the first opening 124. The receiving unit 144 is coupled to the third opening 134.

In an embodiment, the first shell portion 120 and the second shell portion 130 are connected to the ultrasonic sensor 140. Specifically, the transmitting unit 142 is embedded into the first shell portion 120 and coupled to the first opening 124, and the receiving unit 144 is also embedded into the second shell portion 130 and coupled to the third opening 134. The first shell portion 120 and the second shell portion 130 separates the transmitting unit 142 and the receiving unit 144 of the ultrasonic sensor 140, so as to effectively avoid the direct transmission of ultrasonic wave transmitted by the transmitting unit 142 to the receiving unit 144.

In some embodiments, the first opening 124 is circular, which conforms to the shape of the transmitting end of the transmitting unit 142, so that the ultrasonic wave enters the first through hole 122 without obstruction. In an embodiment, the ultrasonic sensing device 100 concentrates the ultrasonic wave into the first through hole 122 through the first shell portion 120 and transmits it outward from the second opening 126, thereby increasing the ultrasonic transmission distance. Specifically, as shown in FIG. 1 and FIG. 2, the first through hole 122 is a horn hole, and the opening area of the first opening 124 is larger than that of the second opening 126. This structural configuration facilitates the concentration of energy of the ultrasonic wave transmitted by the transmitting unit 142 along the reducing first through hole 122 to the second opening 126, thereby transmitting the ultrasonic wave further. However, the shape of the first through hole 122 of the disclosure is not limited thereto, and it is a reducing hole in another shape in an embodiment.

The second opening 126 is designed into an elongated slotted hole, having the vertical length greater than the horizontal length. In one embodiment, the frequency of the ultrasonic wave is about 40 kHz, which is close to the frequency of light wave. In this case, the ultrasonic wave has a slit diffraction characteristic similar to that of the light wave. Therefore, when the ultrasonic wave transmitted by the transmitting unit 142 passes through the first through hole 122 and reaches the second opening 126, a slit diffraction phenomenon occurs due to the shape of the second opening 126, thereby further narrowing the vertical transmission range of the ultrasonic wave and widening the horizontal transmission range.

Figure 3A:
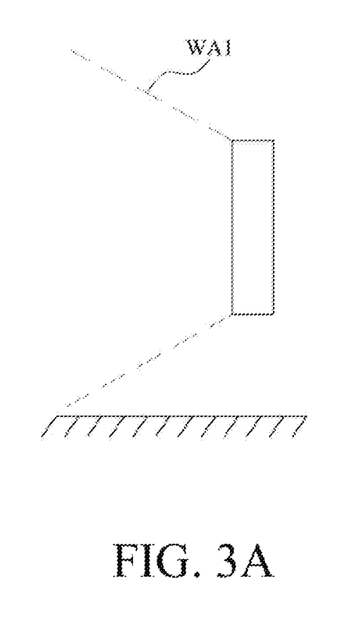
FIG. 3A is a side view of an ultrasonic transmission range of a known ultrasonic sensor.
Figure 3B:
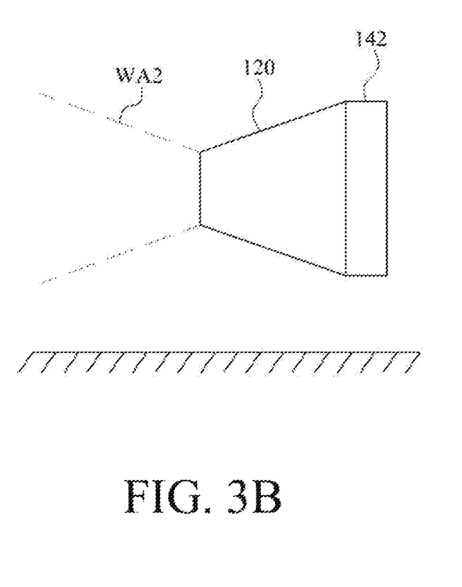
FIG. 3B is a side view of an ultrasonic transmission range of the ultrasonic sensing device according to the disclosure.

Refer to FIG. 3A and FIG. 3B together. FIG. 3A is a side view of an ultrasonic transmission range WA1 of a known ultrasonic sensor. FIG. 3B is a side view of an ultrasonic transmission range WA2 of the ultrasonic sensing device 100 according to the disclosure. As shown in FIG. 3A, the known ultrasonic sensor directly transmits ultrasonic wave outside from the transmitting end. As shown in FIG. 3B, which is a cross-sectional view of the ultrasonic sensing device 100 taken along line 3-3 in FIG. 1, the ultrasonic wave transmitted by the transmitting unit 142 is transmitted out through the second opening 126 of the first shell portion 120. Since the first shell portion 120 has a special structure, the transmission range WA2 is significantly more concentrated than the transmission range WA1, i.e., narrowed in the vertical direction. Therefore, when detecting a front obstacle, the transmitted ultrasonic wave is not easily reflected by a small object on the ground, thereby reducing the ultrasonic wave counteraction caused by the small object and the blind area caused by the ground effect.

Refer to FIG. 1 and FIG. 2 again. As shown, the second through hole 132 is a horn hole, and its reducing direction is opposite to that of the first through hole 122. That is, the opening area of the fourth opening 136 is larger than that of the third opening 134. This structural configuration facilitates the concentration of energy of the reflected ultrasonic wave along the reducing second through hole 132 to the third opening 134, thereby enhancing the sound receiving effect. However, the shape of the second through hole 132 of the disclosure is not limited thereto, and it is a reducing hole in another shape in an embodiment.

Figure 4:
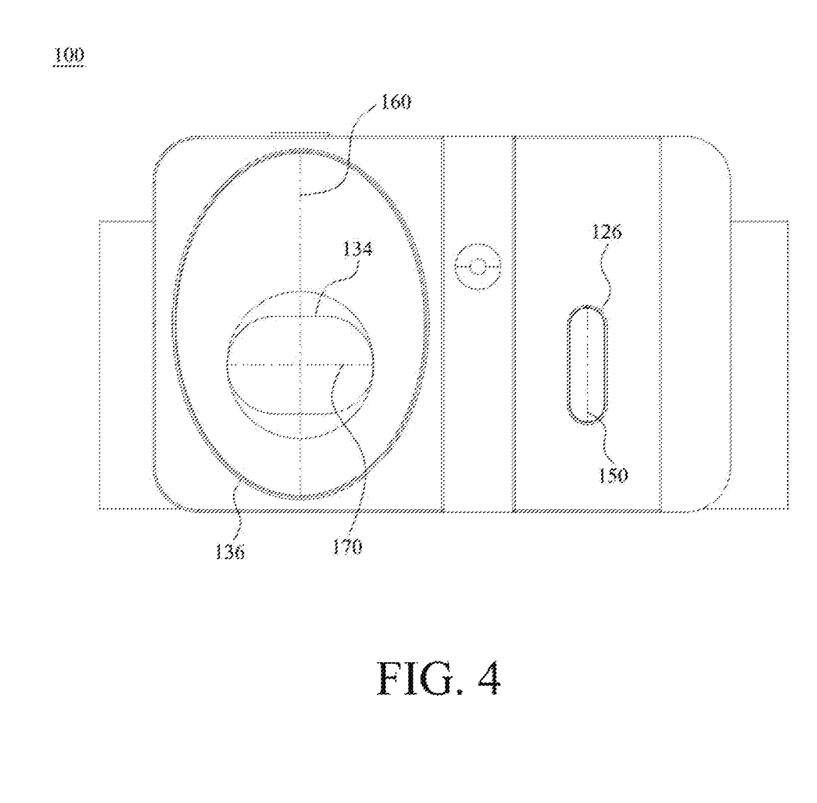
FIG. 4 is a front view of the ultrasonic sensing device in FIG. 1.

Refer to FIG. 4, which is a front view of the ultrasonic sensing device 100 in FIG. 1. As shown in FIG. 4, the second opening 126 is in the shape of an elongated slotted hole, and has a first long axis 150. The third opening 134 is elliptical and has a third long axis 170. The fourth opening 136 is elliptical with the largest area and has a second long axis 160. Due to the above-described ultrasonic diffraction characteristic, when the second long axis 160 of the elliptical fourth opening 136 is perpendicular to the ground, the sound receiving in the horizontal direction is facilitated. On the other hand, when the third long axis 170 of the elliptical third opening 134 is parallel to the ground, the vertical sound receiving in the second through hole 132 is facilitated. Therefore, after the ultrasonic sensing device 100 enhances the reception of the reflected ultrasonic wave in the horizontal direction, the sound receiving effect is optimized under the cooperation of the fourth opening 136 and the third opening 134 and the action of the reducing second through hole 132.

Further, in one or more embodiments, the second long axis 160 is parallel to the first long axis 150, so that the oblique direction of the transmitted ultrasonic wave matches (or acts in concert with) the oblique direction of the received ultrasonic wave to enhance the sound receiving effect. On the other hand, the third long axis 170 is perpendicular to the second long axis 160, so that the third opening 134 matches the geometrical shape of the second through hole 132 that is long in the vertical direction and narrow in the horizontal direction, to enhance the vertical sound receiving in the second through hole 132 and then optimize the overall sound receiving effect.

Figure 5:
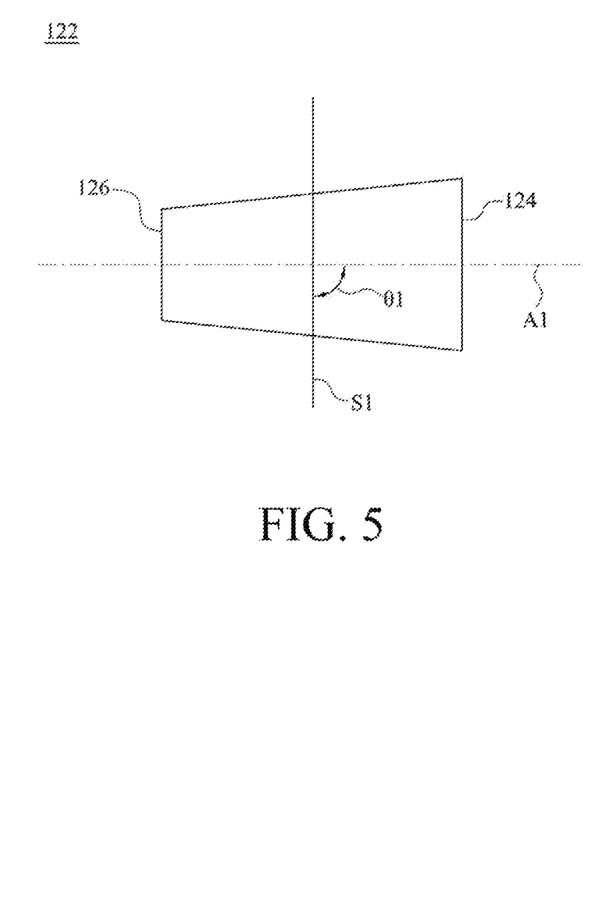
FIG. 5 is a side view of a first through hole according to an embodiment of the disclosure.

Refer to FIG. 5, which is a side view of the first through hole 122 according to an embodiment. As shown in FIG. 5, the first opening 124 is parallel to the plane S1, and the angle θ1 between the axis A1 connecting the center of the first opening 124 with the center of the second opening 126 and the plane S1 is a right angle. In detail, the first through hole 122 is symmetrical in the vertical direction through the plane S1 and the axis A1 connecting the center of the first opening 124 with the center of the second opening 126. Therefore, the ultrasonic wave is transmitted straight forward through the first through hole 122. It is noted that the angle θ1 between the axis A1 and the plane S1 in the disclosure is not limited thereto. In an embodiment, the angle θ1 is a non-right angle. That is, the first through hole 122 is inclined and asymmetric in the vertical direction. Specifically, the inclination of the axis A1 relative to the plane S1 is known from the angle θ1. By adjusting the included angle θ1, the ultrasonic wave is transmitted particularly in a specific direction. In an embodiment, the ultrasonic wave is transmitted up to 10 degrees, up to 20 degrees, or down to 10 degrees. However, the asymmetric arrangement of the first through hole 122 in the disclosure is not limited thereto. In an embodiment, the first through hole 122 is also asymmetric in the horizontal direction besides the vertical direction, so that the ultrasonic wave is transmitted in a specific direction more accurately.

Figure 6:
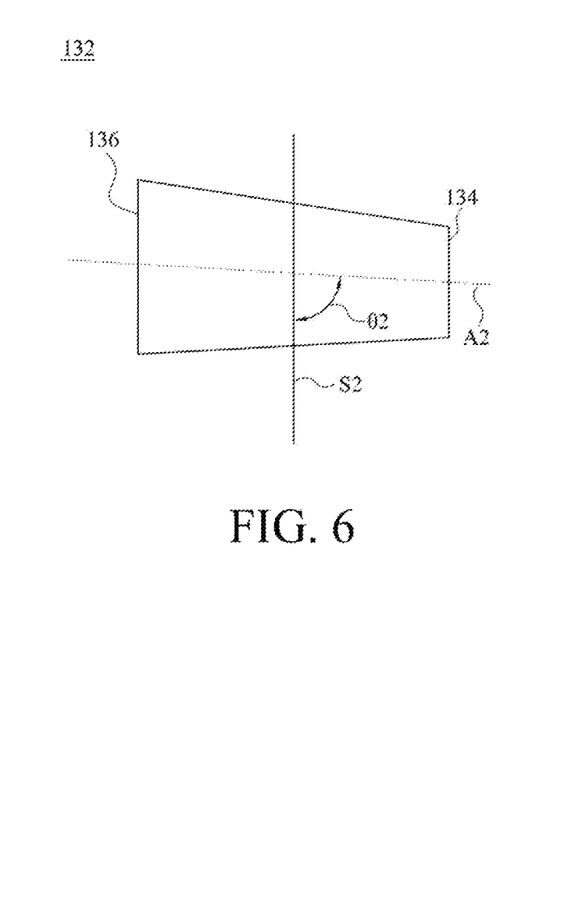
FIG. 6 is a side view of a second through hole according to an embodiment of the disclosure.

Refer to FIG. 6, which is a side view of the second through hole 132 according to an embodiment. As shown in FIG. 6, the third opening 134 is parallel to the plane S2, and the angle θ2 between the axis A2 connecting the center of the third opening 134 with the center of the fourth opening 136 and the plane S2 is a non-right angle. In this embodiment, the second through hole 132, the third opening 134, the fourth opening 136, the plane S2, the axis A2 and the angle θ2 are the same as the embodiment of the corresponding elements in FIG. 5, so the arrangement of the second through hole 132 is clearer with reference to the aforementioned relevant description. Specifically, with the aforementioned arrangement, the second through hole 132 is inclined to receive sound in a specific direction particularly. As shown in FIG. 6, sound is received slightly upward to avoid the ultrasonic wave reflected by the small object on the ground. It is noted that the angle θ2 between the axis A2 and the plane S2 in the disclosure is not limited thereto. In an embodiment, the angle θ2 is a right angle. That is, the second through hole 132 is arranged horizontally.

Further, in one or more embodiments, the angle θ2 is equal to the angle θ1. After the ultrasonic wave transmitted in a specific direction is reflected, sound is received in the specific direction to improve the detection effect. Further, a plurality of the ultrasonic sensing devices 100 according to the disclosure is arranged, and each ultrasonic sensing device 100 is configured to face a specific direction so as to enhance the overall detection effect.

Figure 7:
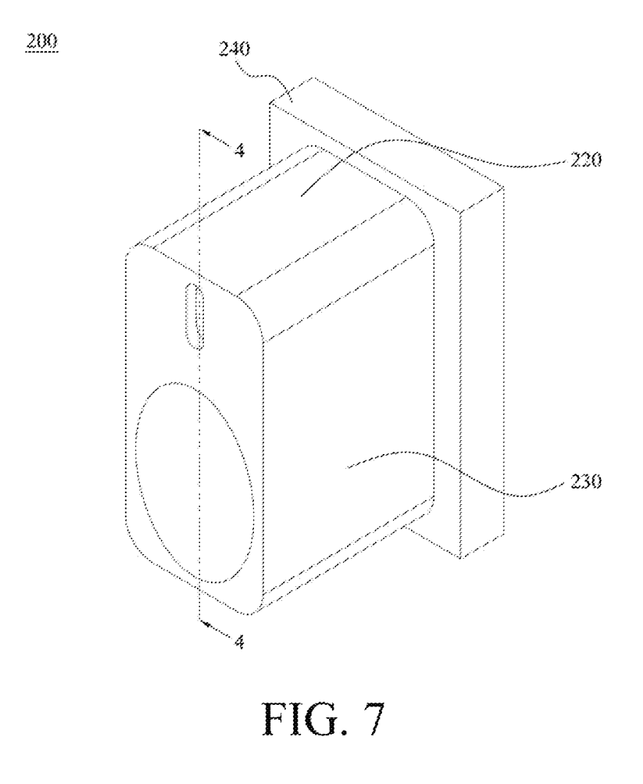
FIG. 7 is a three-dimensional diagram of an ultrasonic sensing device according to another embodiment of the disclosure.
Figure 8:
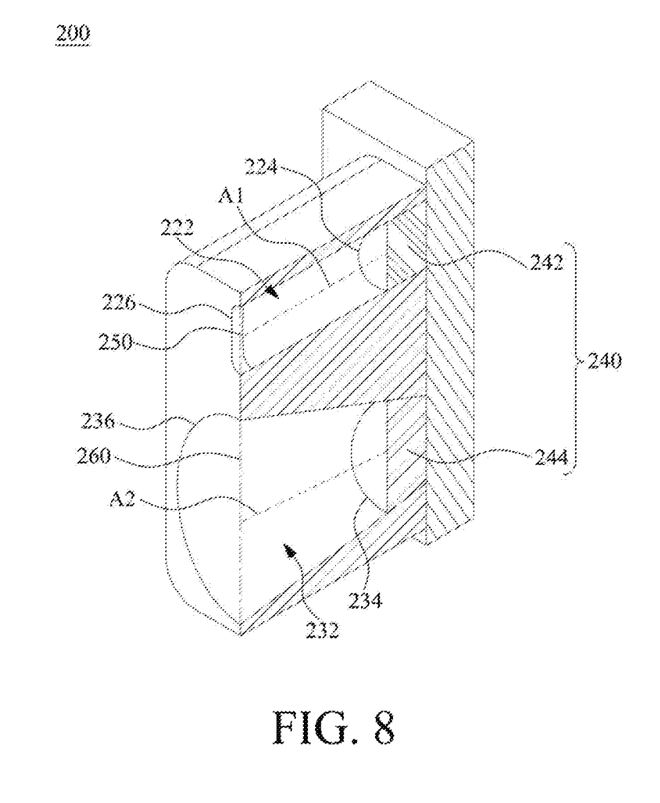
FIG. 8 is a cross-sectional view of the ultrasonic sensing device taken along line 4-4 in FIG. 7 according to the disclosure.

Refer to FIG. 7 and FIG. 8 together. FIG. 7 is a three-dimensional diagram of an ultrasonic sensing device 200 according to another embodiment. FIG. 8 is a cross-sectional view of the ultrasonic sensing device 200 taken along line 4-4 in FIG. 7. In FIG. 7 and FIG. 8, the ultrasonic sensing device 200 includes a first shell portion 220, a second shell portion 230, and an ultrasonic sensor 240. The first shell portion 220 has a first through hole 222. The first through hole 222 includes a first opening 224 and a second opening 226. The second shell portion 230 has a second through hole 232. The second through hole 232 includes a third opening 234 and a fourth opening 236. The ultrasonic sensor 240 includes a transmitting unit 242 and a receiving unit 244. The transmitting unit 242 is coupled to the first opening 224. The receiving unit 244 is coupled to the third opening 234. The second opening 226, the second through hole 232, the fourth opening 236, the ultrasonic sensor 240, the transmitting unit 242 and the receiving unit 244 in this embodiment are the same as the corresponding elements in the embodiments shown in FIG. 1 to FIG. 6. Referring to the foregoing related descriptions, details are not described herein again.

It is noted that, in comparison with the embodiments shown in FIG. 1 to FIG. 6, the lengths of the first opening 224 and the second opening 226 in this embodiment in the vertical direction are equal to each other, and the length of the first opening 224 in the horizontal direction is greater than that of the second opening 226 in the horizontal direction. That is, the opening area of the first opening 224 is larger than that of the second opening 226. Therefore, the first through hole 222 is also in a horn shape, and also has the same effect of assisting the energy concentration of ultrasonic wave as that of the first through hole 122 in the foregoing embodiment.

In addition, compared to the embodiments shown in FIG. 1 to FIG. 6, the first shell portion 220 and the second shell portion 230 in this embodiment are stacked in a direction parallel to the first long axis 250, and the first shell portion 220 is arranged on the second shell portion 230. Specifically, as shown in FIG. 7 and FIG. 8, the first shell portion 220 includes a first through hole 222, and the first through hole 222 includes a second opening 226 having a first long axis 250. The second shell portion 230 includes a second through hole 232, and the second through hole 232 includes a fourth opening 236 having a second long axis 260. When the first long axis 250 is collinear with the second long axis 260, the first shell portion 220 and the second shell portion 230 are stacked along the same axis. With this structural configuration, the transmitting unit 242 and the receiving unit 244 are further spaced apart, so that the ultrasonic wave transmitted via the elongated second opening 226 is separated from the ultrasonic wave received via the elongated fourth opening 236, which further reduces the crosstalk of the two. However, the method of stacking the first shell portion 220 and the second shell portion 230 in this embodiment is not limited thereto. In a practical application, the first long axis 250 and the second long axis 260 are non-collinear. That is, the first shell portion 220 and the second shell portion 230 deviate from each other or are staggered with each other in a direction perpendicular to the first long axis 250.

Figure 9:
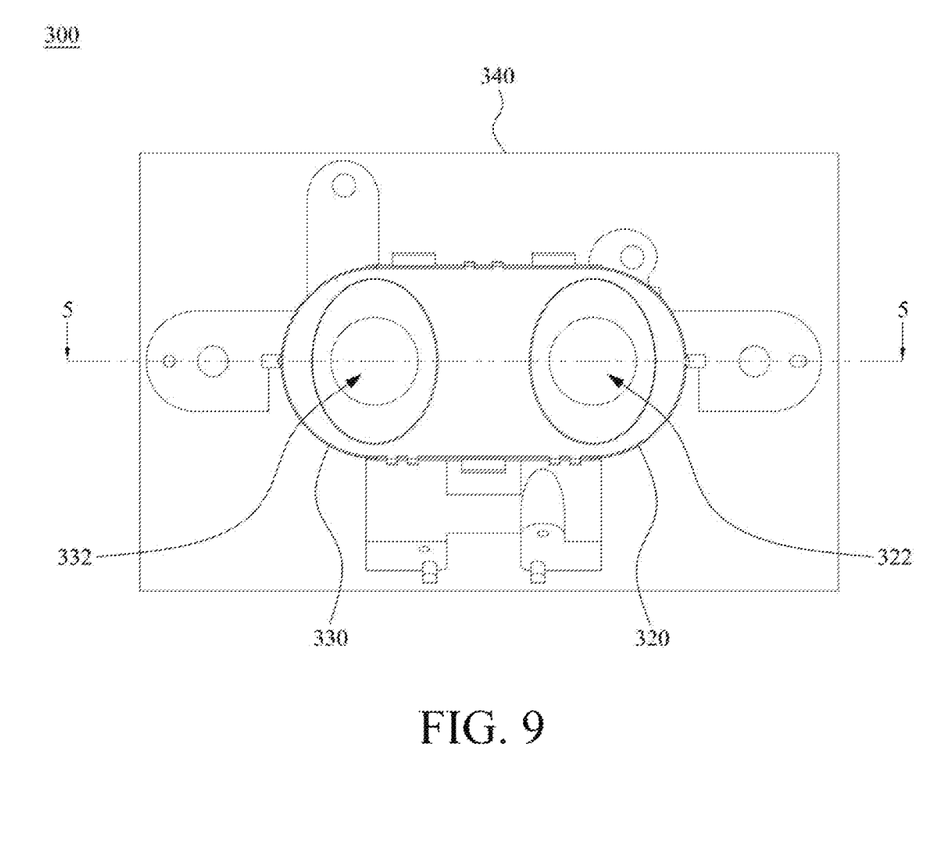
FIG. 9 is a front view of an ultrasonic sensing device according to a further embodiment of the disclosure.
Figure 10:
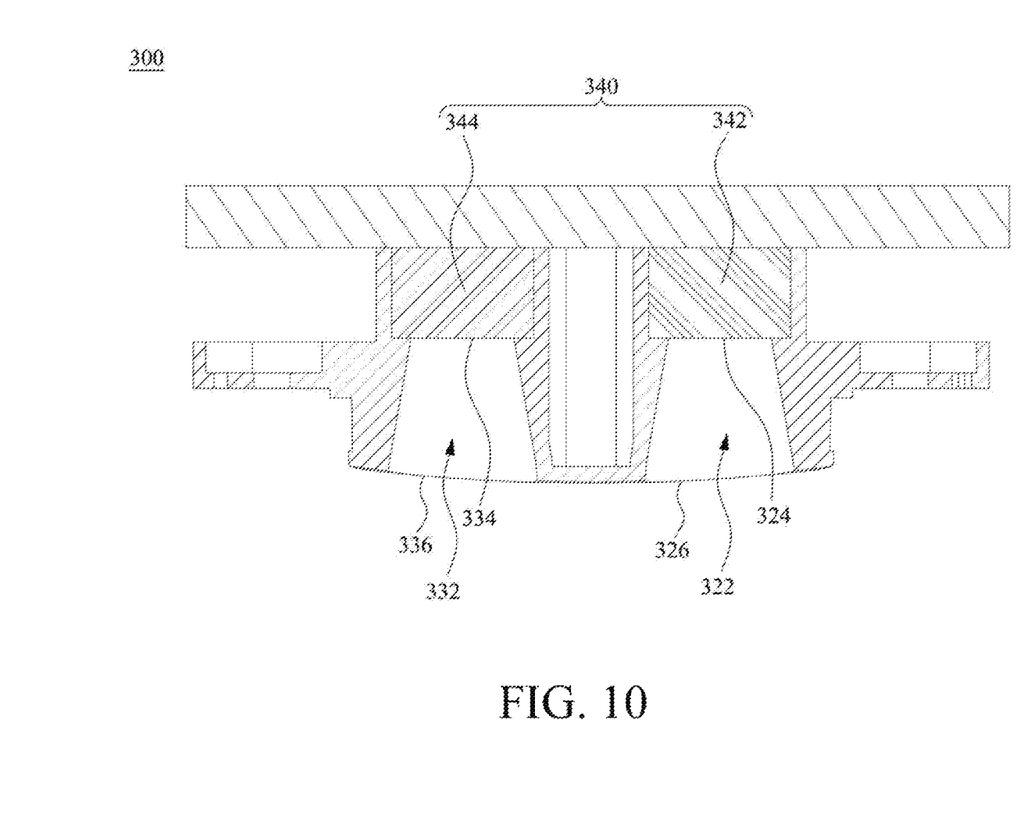
FIG. 10 is a cross-sectional view of the ultrasonic sensing device taken along line 5-5 in FIG. 9 according to the disclosure.

Refer to FIG. 9 and FIG. 10 together. FIG. 9 is a front view of an ultrasonic sensing device 300 according to a further embodiment. FIG. 10 is a cross-sectional view of the ultrasonic sensing device 300 taken along line 5-5 in FIG. 9 according to the disclosure. In FIG. 9 and FIG. 10, the ultrasonic sensing device 300 includes a first shell portion 320, a second shell portion 330, and an ultrasonic sensor 340. The first shell portion 320 has a first through hole 322. The first through hole 322 includes a first opening 324 and a second opening 326. The second shell portion 330 has a second through hole 332. The second through hole 332 includes a third opening 334 and a fourth opening 336. The ultrasonic sensor 340 includes a transmitting unit 342 and a receiving unit 344. The transmitting unit 342 is coupled to the first opening 324. The receiving unit 344 is coupled to the third opening 334. The first opening 324, the second through hole 332, the fourth opening 336, the ultrasonic sensor 340, the transmitting unit 342 and the receiving unit 344 in this embodiment are the same as the corresponding elements in the embodiments shown in FIG. 1 to FIG. 6. Referring to the foregoing related descriptions, details are not described herein again.

It is noted that the second opening 326 in this embodiment is in an elongated elliptical shape as compared with the embodiments shown in FIG. 1 to FIG. 6. The third opening 334 is circular and conforms to the shape of the receiving unit 344. The first opening 324 has the same opening area as the third opening 334. The opening areas of the second opening 326 and the fourth opening 336 are the same, and the opening area of the second opening 326 is larger than that of the first opening 324. Therefore, the first through hole 322 and the second through hole 332 in this embodiment are both in the horn shape and are reduced in the same direction. With the above structural configuration, the first through hole 322 and the second through hole 332 are relatively shortened in comparison with the above-described other embodiments, and thus this embodiment is applied to an apparatus requiring a small-sized ultrasonic sensing device.

Referring to FIG. 1 to FIG. 10 again, in one or more embodiments, the first shell portion and the second shell portion are connected with each other to form a one-piece structure formed integrally. However, the arrangement of first shell portion and the second shell portion in the disclosure is not limited thereto. In an embodiment, the first shell portion and the second shell portion are separated from each other. Specifically, the transmitting unit coupled to the first shell portion and the receiving unit coupled to the second shell portion are separately installed at different positions of other device, so that the transmission and receiving of the ultrasonic wave meet actual requirements.

Figure 11:
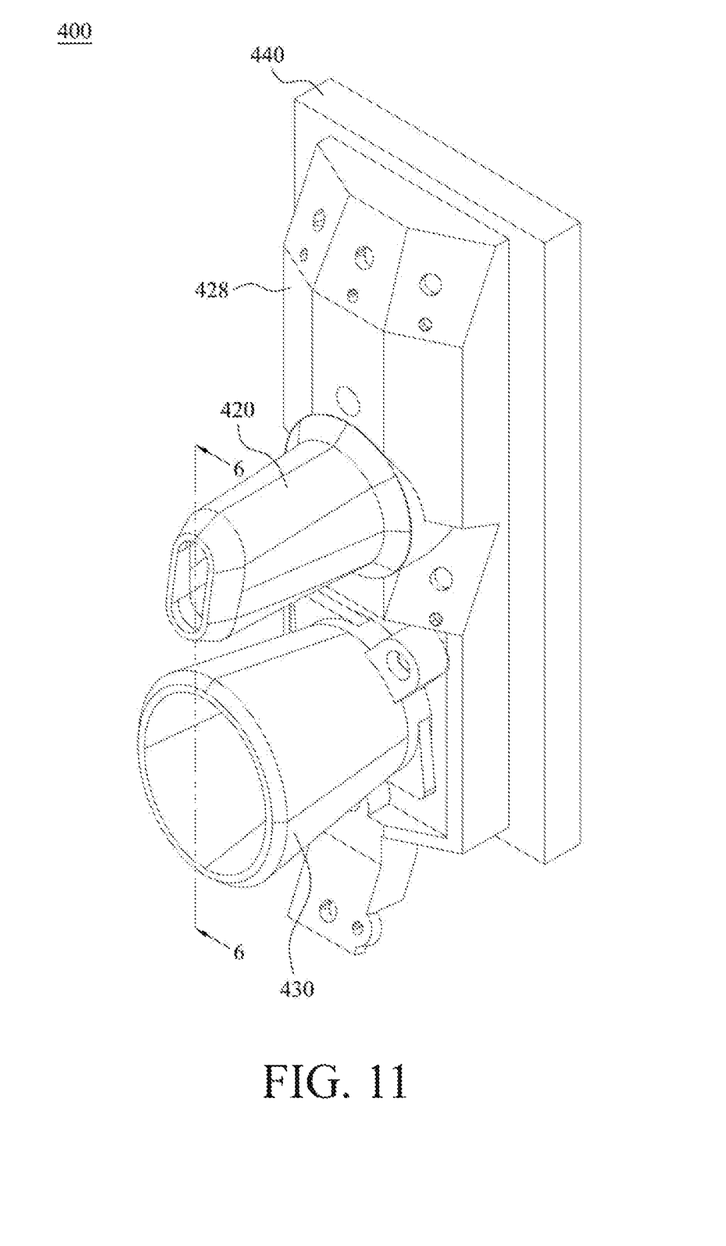
FIG. 11 is a three-dimensional diagram of an ultrasonic sensing device according to one or more embodiments of the disclosure.
Figure 12:
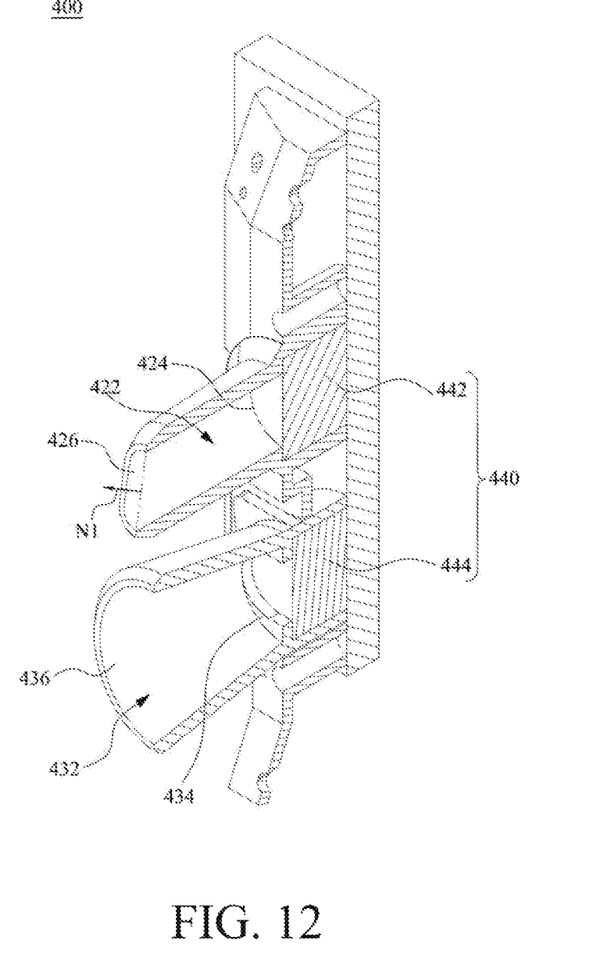
FIG. 12 is a cross-sectional view of the ultrasonic sensing device taken along line 6-6 in FIG. 11.

Refer to FIG. 11 and FIG. 12 together. FIG. 11 is a three-dimensional diagram of an ultrasonic sensing device 400 according to one or more embodiments. FIG. 12 is a cross-sectional view of the ultrasonic sensing device 400 taken along line 6-6 in FIG. 11. In FIG. 11 and FIG. 12, the ultrasonic sensing device 400 includes a first shell portion 420, a second shell portion 430, and an ultrasonic sensor 440. The first shell portion 420 has a first through hole 422. The first through hole 422 includes a first opening 424 and a second opening 426. The second shell portion 430 has a second through hole 432. The second through hole 432 includes a third opening 434 and a fourth opening 436. The ultrasonic sensor 440 includes a transmitting unit 442 and a receiving unit 444. The transmitting unit 442 is coupled to the first opening 424. The receiving unit 444 is coupled to the third opening 434. The second through hole 432, the third opening 434, the fourth opening 436, the ultrasonic sensor 440, the transmitting unit 442 and the receiving unit 444 in this embodiment are the same as the corresponding elements in the embodiments shown in FIG. 1 to FIG. 6. Referring to the foregoing related descriptions, details are not described herein again.

It is noted that, in comparison with the embodiments shown in FIG. 1 to FIG. 6, lengths of the first opening 424 and the second opening 426 in this embodiment in the vertical direction are equal to each other, and the length of the first opening 424 in the horizontal direction is greater than that of the second opening 426 in the horizontal direction. That is, the opening area of the first opening 424 is larger than that of the second opening 426. Therefore, the first through hole 422 is also in a horn shape, and also has the same effect of assisting the energy concentration of ultrasonic wave as that of the first through hole 122 in the foregoing embodiment.

Furthermore, the second opening 426 is reduced and inclined. Specifically, the opening area of the second opening 426 is smaller than the cross-sectional area of the first through hole 422 in any vertical direction, which achieves the reducing configuration of the second opening 426 and helps another energy concentration of the ultrasonic wave passing through the horn-shaped first through hole 422. On the other hand, the opening plane of the second opening 426 is not parallel to that of the first opening 424 and its normal direction N1 is away from the second through hole 432. Therefore, the ultrasonic wave transmitted outward through the second opening 426 is transmitted slightly upward to reduce the chance of being reflected by the ground small object, thereby reducing the ultrasonic wave counteraction caused by the small object and the blind area caused by the ground effect.

On the other hand, compared with the embodiments shown in FIG. 1 to FIG. 10 above, the first shell portion 420 and the second shell portion 430 in this embodiment are two independent elements and are connected with each other through a base 428. That is, the first shell portion 420 and the second shell portion 430 are not a one-piece structure formed integrally. Specifically, the first shell portion 420 further includes a base 428. The second shell portion 430 is embedded into the base 428, so that the first shell portion 420 and the second shell portion 430 are in contact with each other only at the base 428. However, the connection of the first shell portion 420 and the second shell portion 430 in the disclosure is not limited thereto. In an embodiment, the second shell portion 430 is bonded to the first shell portion 420 by an adhesive.

From the above detailed description of the specific embodiments in the disclosure, it is clearly seen that the first shell portion and the second shell portion having special structures separate the transmitting unit and the receiving unit of the ultrasonic sensor to reduce the direct transmission of ultrasonic wave from the transmitting unit to the receiving unit. Furthermore, the second opening is elongated and is smaller than the first opening in area, so that the ultrasonic wave exiting from the second opening diffracts. The ultrasonic wave is concentrated within the transmission range of ultrasonic wave in the long axis direction of the second opening and expanded within the transmission range of ultrasonic wave in the short axis direction of the second opening, thereby reducing the detection of small objects on the ground when a front obstacle is detected and increasing the horizontal diffusion of the ultrasonic wave.

Although the disclosure is described with reference to the above embodiments, the embodiments are not intended to limit the disclosure. Any person of ordinary skill in the art may make variations and modifications without departing from the spirit and scope of the disclosure. Therefore, the protection scope of the disclosure should be subject to the appended claims.

What is claimed is:

1. An ultrasonic sensing device, comprising:
   a first shell portion having a first through hole, the first through hole having a first opening and a second opening;
   a second shell portion having a second through hole, the second through hole having a third opening and a fourth opening; and
   an ultrasonic sensor coupled to the first shell portion and the second shell portion and comprising:
   a transmitting unit coupled to the first opening; and
   a receiving unit coupled to the third opening,
   wherein at least one of the second opening and the fourth opening is elongated, the fourth opening has a first sidewall and a second sidewall opposite the first sidewall, and a vertical distance between a bottom of the first sidewall and the receiving unit is smaller than a vertical distance between a bottom of the second sidewall and the receiving unit.

2. The ultrasonic sensing device according to claim 1, wherein the second opening is elongated and has a first long axis, and the opening area of the second opening is smaller than that of the first opening.

3. The ultrasonic sensing device according to claim 2, wherein the first shell portion and the second shell portion are stacked in a direction parallel to the first long axis.

4. The ultrasonic sensing device according to claim 1, wherein the opening area of the fourth opening is greater than that of the third opening.

5. The ultrasonic sensing device according to claim 4, wherein the second opening is elongated and has a first long axis.

6. The ultrasonic sensing device according to claim 5, wherein the fourth opening is elongated and has a second long axis, and the second long axis is parallel to the first long axis.

7. The ultrasonic sensing device according to claim 6, wherein the third opening is elongated and has a third long axis, and the third long axis is perpendicular to the second long axis.

8. The ultrasonic sensing device according to claim 1, wherein the first opening is parallel to a plane, and the angle between the axis connecting the center of the first opening with the center of the second opening and the plane is a non-right angle.

9. The ultrasonic sensing device according to claim 1, wherein the third opening is parallel to a plane, and the angle between the axis connecting the center of the third opening with the center of the fourth opening and the plane is a non-right angle.

10. The ultrasonic sensing device according to claim 9, wherein the angle is equal to the angle between the axis connecting the center of the first opening with the center of the second opening and the plane.

* * * * *